Figure 1:
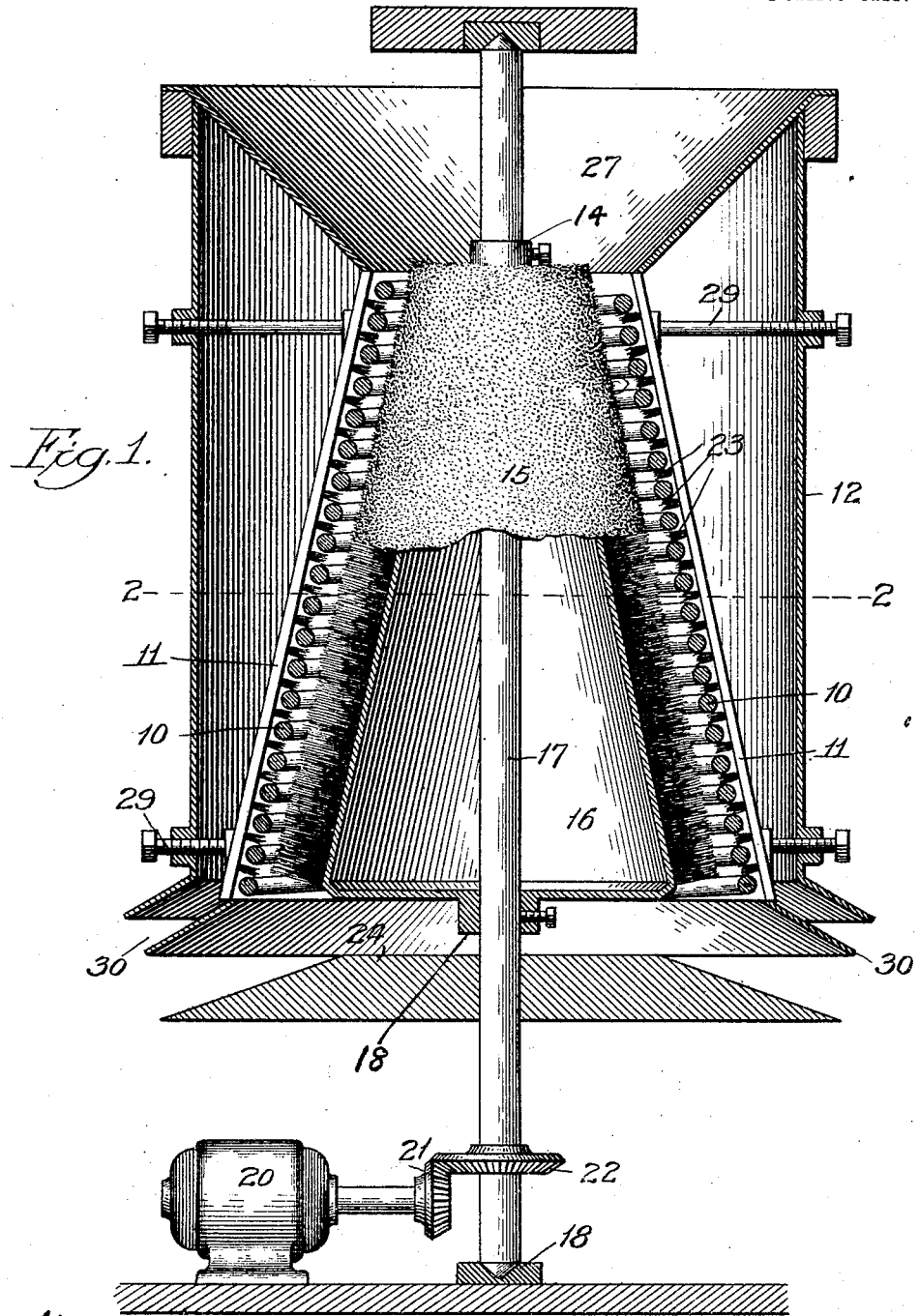

J. B. FOOTE.
APPARATUS FOR STEMMING FRUIT.
APPLICATION FILED MAR. 16, 1914.

1,234,698.

Patented July 24, 1917.
2 SHEETS—SHEET 1.

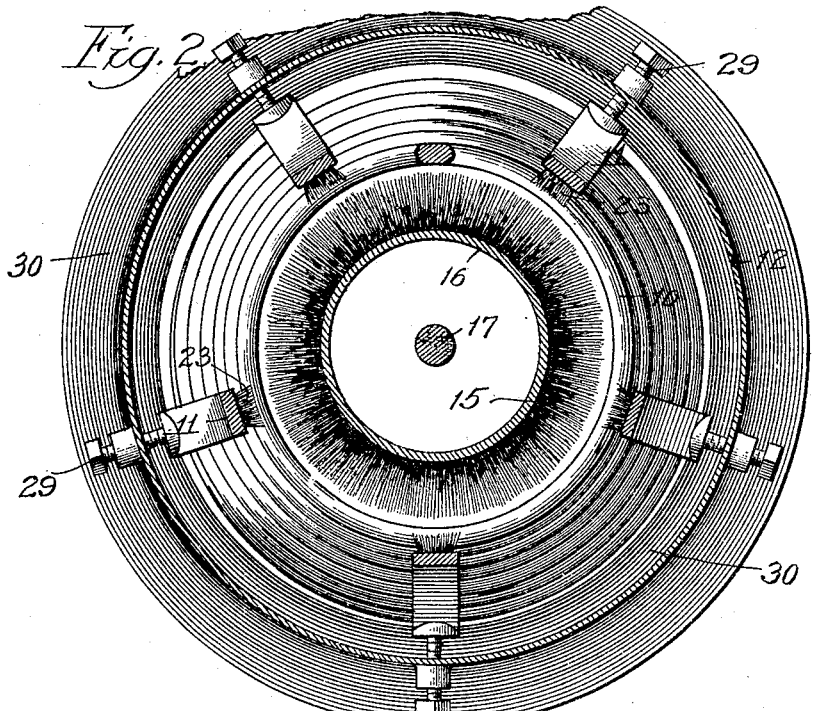
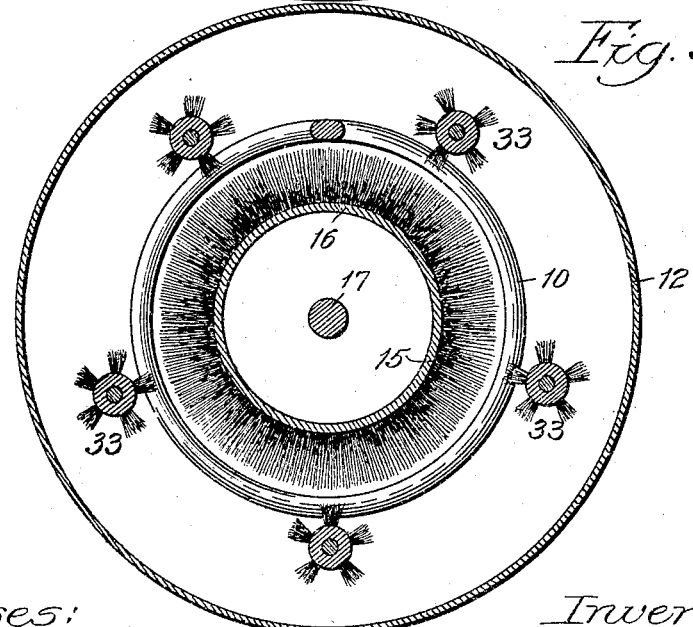

UNITED STATES PATENT OFFICE.

JOHN B. FOOTE, OF OAK PARK, ILLINOIS.

APPARATUS FOR STEMMING FRUIT.

1,234,698.  Specification of Letters Patent.  Patented July 24, 1917.

Application filed March 16, 1914. Serial No. 824,942.

*To all whom it may concern:*

Be it known that I, JOHN B. FOOTE, a resident of Oak Park, in the county of Cook and State of Illinois, have invented certain new and useful Improvements in Apparatus for Stemming Fruit, of which the following is a full, clear, and exact description.

The invention relates to apparatus for removing the stems from fruit, and is particularly adapted for removing the stems from cherries in large quantities.

It has heretofore been proposed to remove the stems from cherries by a machine comprising gripping devices for gripping the stems and pulling them from the cherries. This practice has been found to be inefficient because the cherries could not always be directed in such manner that the stems would pass into the bite of the grippers, and because of the objection to exerting substantial pressure upon the cherries likely to mar or deteriorate the fruit in guiding them to the gripping devices.

In an application filed by me of even date herewith, there is disclosed an apparatus for and method of removing the stems from fresh cherries or similar fruit by causing the fruit to roll in a runway so that the stems will strike the surface of the runway and cause them to be removed by flexing them or whipping them against the wall of the runway, and in which the fruit is forced along the runway by fluid under pressure. In some places where it is desirable to remove the stems from cherries, fluid under pressure is not readily available, and one of the objects of the present invention is to provide apparatus for carrying out the method of removing the stems by causing them to strike a surface in their path while the fruit is being moved or rolled in a runway, in which suitable mechanical means is provided for forcing the fruit through the runway in lieu of the fluid under pressure employed in the apparatus set forth in the aforesaid application.

Another object of the invention is to provide improved apparatus to remove the stems from cherries, which is efficient in operation and which is of great capacity and in which the fruit is carried and rolled in the runway by mechanical means.

The invention further aims to provide an improved apparatus for removing the stems from fresh fruit, such as cherries.

The invention consists in the several novel features hereinafter set forth and more particularly defined by claims at the conclusion hereof.

In the drawings: Figure 1 is a vertical section of an apparatus embodying the invention. Fig. 2 is a section taken on line 2—2 of Fig. 1. Fig. 3 is a horizontal section of a modification.

The improved apparatus comprises essentially, a conoidal helix 10 formed of heavy wire with its coils spaced apart to form a helical runway upon the inner surface of the coil. The outside of this coil 10 is suitably supported in a stationary casing 12 which is rigid with a hopper 27. A series of bars 11 which extend from the top to the bottom of the helix on the outside thereof have their inner surfaces or edges disposed adjacent the helix and are adjustably held by screws 29. A revolving brush 15, secured to a conoidal body 16 is mounted to rotate within the helix 10. The brush-body 16 is mounted on a vertical shaft 17 which has its lower end mounted in a bearing 18 and its upper end in a bearing 14. The brush-body 16 is vertically adjustable on the shaft and being conoidal in form corresponding generally to the conoidal form of the runway formed in the coil 10, the space or clearance between the periphery of the brush and the runway may be varied so that the space between the coil and the brush will be adapted for the travel of cherries which are markedly different in size. That is to say, by raising the rotary brush on shaft 17, the ends of the bristles will be brought into closer relation to the inner surface of the coil or so that the runway will be narrowed and by lowering the brush on the shaft, the clearance between the periphery of the brush and the coil may be increased. Any suitable means, such as an electric motor 20 and gears 21 and 22 may be employed to rotate shaft 17 and brush 15. Funnel 27 directs the fruit from which the stems are to be removed, into the space between the revolving brush 15 and the runway formed by coil 10. Tufts of bristles or brushes 23 on bars 11 extend inwardly into the spaces between several coils of the helix 10. Bristles 23 are secured on bars 11 and extend into the spaces between the coils of the helix.

The operation of the apparatus thus far described will be as follows. Assuming shaft 17 to be driven so that the brush 15 will rotate and cherries to be delivered to hopper 27, each cherry will fall into the upper end of the runway or space between the brush 15 and the helix 10. The brush will be driven in that direction which will cause the cherries to roll in a helical path along the runway and toward the lower end thereof. The bristles of the brush are sufficiently flexible to prevent the cherries from being crushed, but will exert sufficient friction to cause each cherry to roll along the runway formed by coils of the helix 10. In transit through the apparatus, the stems of the cherries will be whipped against the coils or against bars 11 or against the bristles 23 on said bars, being aided in a measure by centrifugal force, causing them to be flexed laterally with respect to the plane of rotation and thereby severing them from the body of the cherries. The tapered form of the helix causes the plane of rotation of the cherry in traveling along the runway to be varied so that at either one time or another, the stem will be sufficiently flexed by one of the obstacles and thus severed from the body of the cherry, and also causes the speed of travel to increase so that the cherries will be separated in transit through the runway, to prevent clogging. The bristles 23 projecting into the spaces between the coils serve as yielding or flexible abutments for short stems on the cherries. By adjusting the bars 11 with the bristles 23, the position of these bristles may be varied to insure the removal of short stems. In practice, it has been found that an apparatus operating in this manner has a great capacity and serves to remove substantially all of the stems from the cherries passing through the apparatus, regardless of the length of the stems, so that when the cherries reach the lower end of the runway, substantially all of the stems will have been severed from the cherries.

Upon leaving the lower end of the runway, the cherries fall upon a disk 24. Most of the stems separated from the cherries are thrown out against the casing 12, and fall onto a chute 30 from which they may be removed in any suitable manner.

In Fig. 3 there is shown a modified form of the invention in which rotary brushes 33 are employed in lieu of the stationary bristles 23.

The invention thus exemplifies an improved apparatus for removing the stems from fruit, such as cherries, in which stem-gripping devices are dispensed with and in which the cherries are caused to travel through a runway by resilient means, such as a brush, which will not crush the cherries and one which operates efficiently to separate the stems from the cherries and which has a large capacity.

The invention is not to be understood as restricted to the details set forth, since these may be modified within the scope of the appended claims without departing from the spirit and scope of the invention.

Having thus described the invention what I claim as new and desire to secure by Letters Patent, is:

1. In apparatus for stemming fresh fruit, the combination of a runway having a smooth surface for fresh fruit to roll on, and resilient mechanical means for moving the fruit in the runway to remove the stems, said runway and means being coöperatively disposed and formed to roll fresh fruit between them in individual succession without subjecting the fruit to crushing pressure and without abrading it.

2. In apparatus for stemming fresh fruit, the combination of a continuous helical runway having a smooth surface for fresh fruit to roll on, and resilient mechanical means for moving the fruit in the runway to remove the stems, said runway and means being coöperatively disposed and formed to roll fresh fruit between them in individual succession without subjecting the fruit to crushing pressure and without abrading it.

3. In apparatus for stemming fresh fruit, the combination of a helical runway having a smooth surface for the fruit to roll on, and a rotary resilient brush for moving the fruit in the runway to remove the stems from the fruit, said brush and runway being coöperatively disposed and formed to roll the fresh fruit between them in individual succession without subjecting the fruit to crushing pressure and without abrading it.

4. In apparatus for stemming fresh fruit, the combination of a helix of wire having its coils spaced apart and having a smooth surface forming a runway for the fruit and resilient means for holding and moving the fruit in the runway to remove the stems from the fruit, said means and coils being coöperatively disposed and formed to roll fresh fruit between them in individual succession without subjecting the fruit to crushing pressure and without abrading it.

5. In apparatus for stemming fresh fruit, the combination of a helical runway having a smooth surface for fresh fruit to roll on, resilient means for moving the fruit in the runway to remove the stems from the fruit, said runway having spaces therein through which the stems escape laterally, said runway and means being coöperatively disposed and formed to roll fresh fruit between them in individual succession without subjecting the fruit to crushing pressure and without abrading it, and abutments disposed in said spaces and to be struck by the stems rolling through the runway.

6. In apparatus for stemming fresh fruit, the combination of a helical runway having a smooth surface for fresh fruit to roll on, resilient means for moving the fruit in the runway to remove the stems from the fruit, said runway having spaces therein through which the stems escape laterally, said runway and means being coöperatively disposed and formed to roll fresh fruit between them in individual succession without subjecting the fruit to crushing pressure and without abrading it, and resilient abutments disposed in said spaces and to be struck by the stems rolling through the runway.

7. In apparatus for stemming fresh fruit, the combination of a runway having a smooth surface for the fruit to roll on, resilient mechanical means for moving the fruit in the runway to remove the stems, said runway and means being coöperatively disposed and formed to roll fresh fruit between them in individual succession without subjecting the fruit to crushing pressure and without abrading it, and means for varying the spacing between the runway and the moving means for different sizes of fruit.

JOHN B. FOOTE.

Witnesses:
MILDRED STUMPF,
KATHARINE GERLACH.

Copies of this patent may be obtained for five cents each, by addressing the "Commissioner of Patents, Washington, D. C."